(12) United States Patent
Lin et al.

(10) Patent No.: US 10,306,350 B1
(45) Date of Patent: May 28, 2019

(54) ELECTRONIC DEVICE HAVING TRANSREFLECTIVE OPTICAL SENSORS

(71) Applicant: Apple Inc., Cupertino, CA (US)

(72) Inventors: Tsu-Hui Lin, Cupertino, CA (US);
Wenrui Cai, San Jose, CA (US);
Xiaoyang Zhang, Singapore (SG);
Yuta Kuboyama, Sunnyvale, CA (US);
Praveesh Chandran, Singapore (SG)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/043,027

(22) Filed: Jul. 23, 2018

(51) Int. Cl.
*H04R 1/10* (2006.01)
*G01S 17/08* (2006.01)

(52) U.S. Cl.
CPC ............ *H04R 1/1041* (2013.01); *G01S 17/08* (2013.01); *H04R 1/1008* (2013.01); *H04R 1/1075* (2013.01); *H04R 2420/07* (2013.01)

(58) Field of Classification Search
CPC ..... H04R 1/1041; H04R 3/12; H04M 1/7253; H04M 2250/12
USPC .......................................... 381/74, 123, 371
See application file for complete search history.

(56) References Cited

U.S. PATENT DOCUMENTS

| | | | |
|---|---|---|---|
| 9,736,564 B2 | 8/2017 | Kurtz | |
| 2015/0215719 A1* | 7/2015 | Turgul | H04R 29/00 381/58 |
| 2016/0256117 A1* | 9/2016 | Baik | A61B 5/7278 |
| 2017/0254699 A1* | 9/2017 | Yang | G01D 5/28 |
| 2017/0295272 A1 | 10/2017 | Gan et al. | |
| 2017/0324437 A1* | 11/2017 | Ruttler | A61B 5/0205 |
| 2017/0353797 A1 | 12/2017 | Hosoi et al. | |

OTHER PUBLICATIONS

Bowers& Wilkins. Bowers& Wilkins PX Quickstart. [retrieved on Jun. 1, 2018]. Retrieved from the Internet <https://www.bowerswilkins.com/headphones/px>.

* cited by examiner

*Primary Examiner* — Alexander Jamal
(74) *Attorney, Agent, or Firm* — Treyz Law Group, P.C.; G. Victor Treyz; David K. Cole

(57) ABSTRACT

An electronic device may include an optical proximity sensor system. The optical proximity sensor system may be a transreflective optical proximity sensor system having a light emitter that emits light into a light-emitting region and a light detector that detects light in a light-detecting region. Control circuitry in the device can use the transreflective optical proximity sensor system to detect objects in an object detection region formed where the light-emitting region and light-detecting region overlap. The electronic device may be a pair of headphones in which housing structures such as housing walls define ear cup cavities. Speakers may be provided in the ear cups of the headphones to provide sound to the ear cup cavities. The transreflective optical proximity sensor system can detect the presence of a user's ear in an ear cup cavity.

20 Claims, 9 Drawing Sheets

ELECTRONIC DEVICE HAVING TRANSREFLECTIVE OPTICAL SENSORS

FIELD

This relates generally to electronic devices, and, more particularly, to electronic devices with sensors.

BACKGROUND

Electronic devices often include sensors. For example, an optical proximity sensor may be used in a device such as a cellular telephone to monitor for the presence of a user's head adjacent to the cellular telephone. The optical proximity sensor may have an infrared light-emitting diode that emits infrared light and an infrared light detector that measures a portion of the emitted light that has been reflected back towards the infrared light detector from nearby objects.

It can be challenging to form a satisfactory optical proximity sensor for an electronic device. If care is not taken, light that is emitted by an optical proximity sensor may be reflected from static portions of the electronic device in which the optical proximity sensor system is being used rather than external objects. These static reflected signals represent a source of noise and can make it difficult to gather accurate optical proximity sensor measurements.

SUMMARY

An electronic device may include an optical proximity sensor system. The optical proximity sensor system may be a transreflective optical proximity sensor system having a light emitter that emits light into a light-emitting region and a light detector that detects light in a light-detecting region. The light emitter and detector may be placed on opposing sides of a housing or may otherwise be configured to form a transreflective sensor. Configurations in which multiple light emitters and/or light detectors are included in a transreflective optical proximity sensor system may be used, if desired.

Control circuitry in an electronic device can use the transreflective optical proximity sensor system to detect objects in an object detection region formed where a light-emitting region associated with a light emitter and a light-detecting region associated with a light detector overlap. During operation, the control circuitry can stop audio playback or take other suitable action in response to output from the transreflective optical proximity sensor.

The electronic device may be a pair of headphones with ear cups. Housing structures such as housing walls may define ear cup cavities in the ear cups that are configured to receive the ears of a user when the headphones are being worn. Speakers may be provided in the ear cups to provide sound to the ear cup cavities and the user's ears.

The transreflective optical proximity sensor can detect the presence of a user's ear in an ear cup cavity. In some configurations, a light emitter is formed on one side of an ear cup cavity and a light detector that does not directly receive light from the light emitter is formed on an opposing side of the ear cup cavity.

DETAILED DESCRIPTION

Electronic devices may be provided with proximity sensor systems. The proximity sensor systems may use light-emitting and light-detecting devices to monitor for the presence of external objects. A proximity sensor system may include one or more light-emitting devices and one or more light detectors. In some configurations, the light-emitting and light-detecting devices are arranged to form a transreflective proximity sensor system in which light from a light emitter is not directly received by a corresponding light detector and in which noise contributions due to light reflections from static objects such as portions of the electronic device are reduced.

During operation of an electronic device with an optical proximity sensor such as a transreflective proximity sensor, emitted light from a light-emitting device may reflect (scatter) from an external object in the vicinity of the electronic device. The reflected light may be detected by a light-detecting device. When no external object is present, the amount of detected light is low. Control circuitry in the electronic device may take suitable action based on the output of the proximity sensor.

As one example, consider an optical proximity sensor system such as a transreflective optical proximity sensor system in an electronic device such as a pair of headphones. In this type of environment, control circuitry in the headphones can adjust audio based on whether the headphones are being worn on a user's head and/or based on whether a device is being worn in a reversed or unreversed orientation. When it is determined that the headphones are not being worn, audio playback can be stopped and/or other actions can be taken (e.g., to reduce power consumption by circuitry in the headphones).

As another example, a portable device such as a cellular telephone or computer can use a transreflective proximity sensor to detect hand gestures and can take action such as adjusting displayed content based on the detected hand gestures. In other types of electronic devices, other actions can be taken when external objects are detected.

Figure 1:
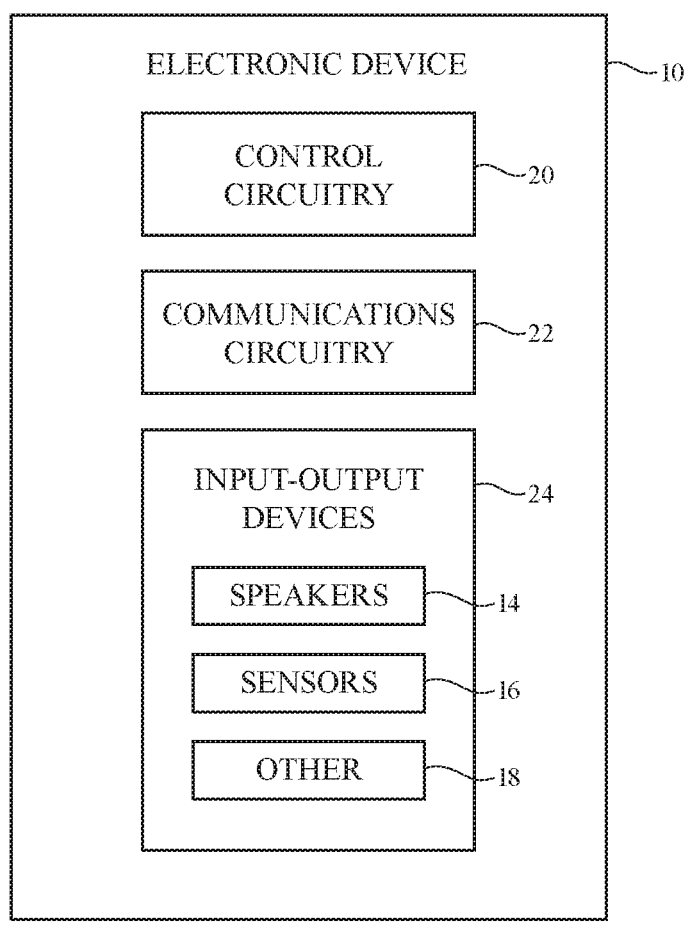
FIG. 1 is a schematic diagram of an illustrative electronic device in accordance with an embodiment.

A schematic diagram of an illustrative electronic device having an optical proximity sensor system such as a transreflective optical proximity sensor system is shown in FIG. 1. Device 10 may be a pair of headphones (e.g., stand-alone headphones and/or headphones associated with and/or incorporated into a head-mounted display device), earphones that are secured to the ears of a user with over-the-ear hooks, earbuds that are worn in a user's ear canals, a cellular telephone, a tablet computer, a laptop computer, a wristwatch device or other wearable device, a television, a stand-alone computer display or other monitor, a computer display with an embedded computer (e.g., a desktop computer), a system embedded in a vehicle, kiosk, or other embedded electronic device, a media player, or other electronic equipment.

Device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 20 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc.

To support communications between device 10 and external equipment, control circuitry 20 may communicate using communications circuitry 22. Circuitry 22 may include antennas, radio-frequency transceiver circuitry, and other wireless communications circuitry and/or wired communications circuitry. Circuitry 22, which may sometimes be referred to as control circuitry and/or control and communications circuitry, may support bidirectional wireless communications between device 10 and external equipment over a wireless link (e.g., circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link). Wireless communications may, for example, be supported over a Bluetooth® link, a WiFi® link, a 60 GHz link or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Input-output devices 24 may be used in gathering user input, in gathering information on the environment surrounding the user, and/or in providing a user with output. During operation, control circuitry 20 may use sensors and other input devices in devices 24 to gather input and can control output devices in devices 24 to provide desired output.

Devices 24 may include speakers 14. Speakers 14 may be used to provide audio to a user. In some configurations, device 10 may include ear cups or other headphone structures in which the speakers are housed. In other configurations, speakers 14 may be mounted in a cellular telephone or computer housing. If desired, devices 24 may include other audio devices such as one or more microphones. Microphones may be used, for example, to gather noise cancellation signals during use of speakers 14 and/or may be used in gathering voice input from a user.

Sensors 16 in input-output devices 24 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor associated with a display and/or a touch sensor that forms a button, trackpad, or other input device not associated with a display), and other sensors. If desired, sensors 16 may include optical sensors such as optical sensors that emit and detect light (e.g., optical proximity sensors such as transreflective optical proximity structures), ultrasonic sensors, and/or other touch and/or proximity sensors, monochromatic and color ambient light sensors, image sensors, fingerprint sensors, temperature sensors, proximity sensors and other sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors, depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, and/or other sensors. In some arrangements, device 10 may use sensors 16 and/or other input-output devices to gather user input (e.g., buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.).

If desired, electronic device 10 may include additional components (see, e.g., other devices 18 in input-output devices 24). The additional components may include displays (e.g., an organic light-emitting diode display, a liquid crystal display, an electrophoretic display, an electrowetting display, a plasma display, a microelectromechanical systems display, a display having a pixel array formed from crystalline semiconductor light-emitting diode dies that are sometimes referred to as microLEDs, and/or other displays), haptic output devices, light producing output devices such as light-emitting diodes for status indicators, light sources such as light-emitting diodes (e.g., crystalline semiconductor light-emitting diodes) that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, wireless power receiving circuitry, and other circuitry.

Figure 2:
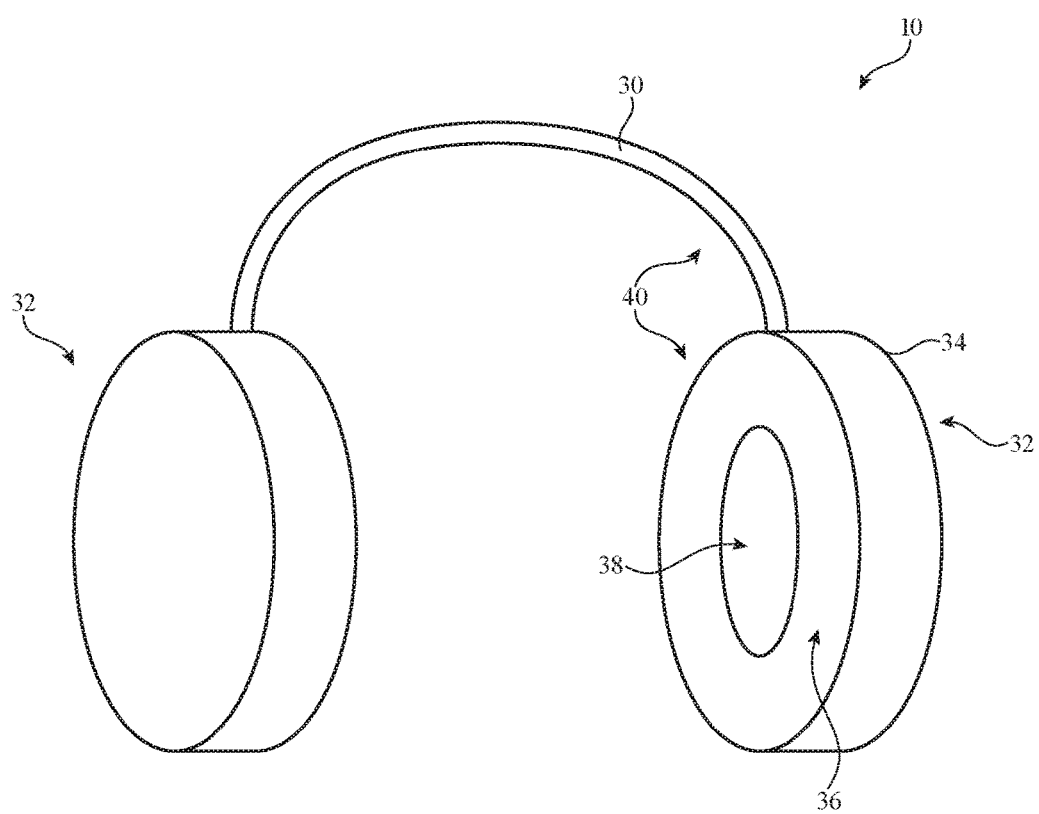
FIG. 2 is a perspective view of an illustrative electronic device such as a pair of headphones in accordance with an embodiment.

A perspective view of an illustrative electronic device is shown in FIG. 2. In the illustrative configuration of FIG. 2, device 10 is a pair of headphones. Device 10 may have support structures 40. These structures may include a supporting member such as member 30 that couples first and second (left and right) respective ear cups 32 together, support structures that form portions of ear cups 32, and other support structures for device 10.

Each ear cup 32 may have a cavity such as cavity 38 that is configured to receive a user's ear. In an illustrative configuration, cavity 38 may be surrounded by rigid cavity walls and by ring-shaped cushions 36 that are coupled to the rigid walls. Support structures 40 may include housing wall structures 34 and/or other housing structures in ear cups 32, member 30, ring-shaped cushions 36, and/or other structures that support the circuitry and electrical components of device 10. Support structures such as these, which may sometimes be referred to as housing structures or support structures for device 10, may be configured so that device 10 of FIG. 2 may be worn on a user's head (e.g., support structures 40 may be head-mounted support structures). Electrical components (e.g., sensors, batteries, speakers, and/or other circuitry) can be supported within interior portions of the support structures and/or on exterior portions of the support structures. For example, speakers, control circuitry, a battery, and other electrical components may be mounted in interior portions of the housing formed by support structures 40 (e.g., ear cup structures 34, member 30, ring-shaped cushions 36, etc.).

Portions of support structures 40 may be rigid (e.g., metal structures, structures formed from glass, rigid polymer, etc.) and portions of support structures 40 may be flexible and/or soft (e.g., fabric, foam, flexible polymer structures, etc.). As an example, ear cup wall structures 34 may be formed at least partly from rigid polymer walls to provide device 10 and a transreflective optical proximity sensor system in device 10 with structural integrity and cushions 36 may be formed from soft materials such as foam covered with soft flexible polymer and/or soft fabric to enhance the comfort of ear cups 32 when worn against a user's head.

Device 10 may include optical proximity sensors such as transreflective optical proximity sensors. As an example, one or both of ear cups 32 may include proximity sensors to detect the presence of a user's ear in cavity 38. In this type of arrangement, optical proximity sensors may serve as ear presence sensors.

In some configurations, the optical proximity sensors can determine whether a left or right ear of a user is present and can therefore be used in determining whether device 10 is being worn in an unreversed configuration (first ear cup on left ear and second ear cup on right ear) or a reversed configuration (first ear cup on right ear and second ear cup on left ear). Optical proximity sensors may therefore also serve as left/right ear sensors. Based on knowledge of whether device 10 is being worn in the unreversed or reversed orientation, left/right audio channel assignments can be adjusted accordingly (e.g., so that audio content such as an audio track associated with a video or other audio content is oriented properly for the user).

In general, proximity sensors can be used in any suitable portion of electronic device 10 (e.g., in a cavity formed in housing structures, on an external surface of a planar device housing, etc.). Configurations in which device 10 includes a cavity such as cavity 38 with proximity sensors may sometimes be described herein as an example.

Figure 3:
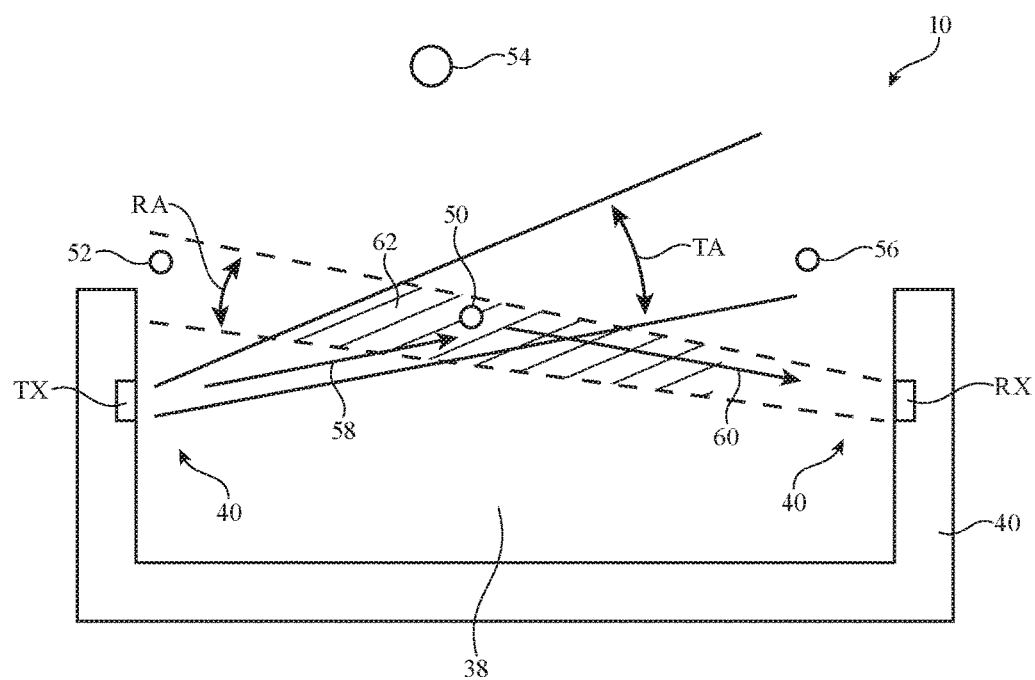
FIGS. 3, 4, 5, and 6 are cross-sectional side views of illustrative electronic devices with sensor systems in accordance with embodiments.
Figure 10:
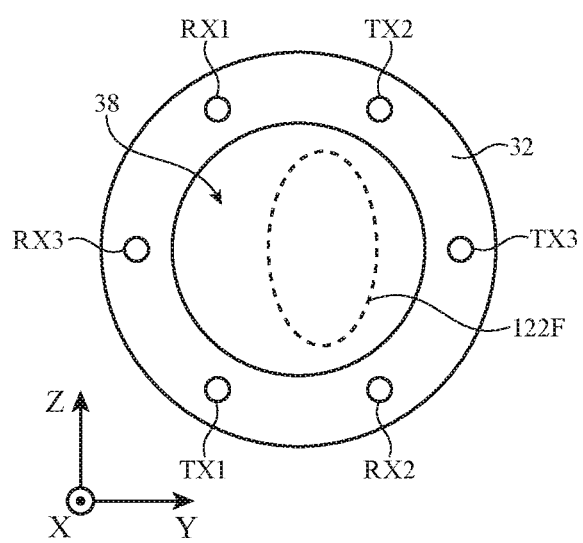
FIG. 10 is a side view of a headphone ear cup with transreflective optical proximity sensor components in accordance with an embodiment.

A cross-sectional side view of a portion of device 10 that includes an illustrative transreflective optical proximity sensor is shown in FIG. 3. In the example of FIG. 10, device 10 has support structures 40 forming a region into which an external object may be received. Support structures 40 may, for example, be configured to form a cavity such as cavity 38 that is configured to receive a user's ear (e.g., support structures 40 may include ear cup housing wall structures 34, ear rings 36, and/or other housing structures).

Optical transreflective sensors may use one or more light emitters and one or more light detectors. The light-emitting devices of an optical transreflective sensor may include light emitters such as light-emitting diodes and/or lasers (e.g., vertical cavity surface emitting laser diodes or other laser diodes). These light emitters, which may sometimes be referred to as light sources or light transmitters, may emit light of any suitable wavelength (e.g., ultraviolet, visible, or infrared). The light-detecting devices of an optical transreflective sensor, which may sometimes be referred to as photodetectors or light receivers, may include light detectors such as silicon photodiodes, silicon phototransistors, or other semiconductor photodetectors. The light-detecting devices may be configured to detect light of the same wavelength that is being emitted by the light-emitting devices.

With one illustrative configuration, which may sometimes be described herein as an example, optical proximity sensor systems for devices 10 may include one or more light transmitters based on infrared light-emitting diodes (or lasers) and one or more light receivers based on infrared semiconductor photodetectors. Other light emitters and light detectors may be incorporated into optical proximity sensor systems for devices 10 if desired.

In the illustrative configuration of FIG. 3, transreflective optical proximity sensor 40 has a light emitter (e.g., an infrared light-emitting diode) such as emitter TX and a light detector such as detector RX. Emitter TX may be configured to emit light over illustrative light-emitting angular range TA. Emitter TX may include lenses, gratings, apertures, and/or other structures that configure the region into which light is emitted. Detector RX may be configured to detect incoming light rays within illustrative light-detecting angular range RA. Detector RX may include lenses, gratings, apertures, and/or other structures that configure the region from which light is detected. A sensor overlap region such as region 62 may be formed where the light-emitting region associated with light emitter TX and the light-detecting region associated with light detector RX overlap. In transreflective sensing configurations such as the configuration of FIG. 3, light emitter TX and light detector RX rae not located immediately adjacent to each other and do not emit and sense in tightly overlapped regions. Rather, light emitter TX and light detector RX are located in different locations on support structures 40 such as on opposing first and second housing walls formed from structures 40 that are located respectively on first and second opposing sides of cavity 38 (e.g., on the left and right of cavity 38 as shown in FIG. 3).

With the transreflective sensing arrangement of FIG. 3, external objects such as object 50 (e.g., a user's ear) that are located in overlap region 62 can be sensed (e.g., control circuitry 20 can determine whether or not an ear or other external object is present in region 62). When object 50 is present in region 62, emitted light rays such as light ray 58 from light emitter TX are reflected from object 50 as reflected rays that are detected by light detector RX (see, e.g., reflected ray 60, which falls within the light detecting region associated with light detector RX). In the absence of object 50, emitted light rays such as light ray 58 are not reflected into the light-detecting region of light detector RX and are therefore not detected.

In transreflective configurations of the type shown in FIG. 3, light detector RX does not directly receive any light from light emitter TX, because the light-emitting region associated with light emitter TX does not overlap light detector RX (as would be the case in a beam-breaking optical detector. This allows region 62 to be located near the exposed outer portion of cavity 38 while light emitter TX and light detector RX are mounted on rigid wall structures deeper in cavity 38 (e.g., the light-emitting region and light-detecting region are angled away from the back of cavity 38). Because external objects can be detected in region 62, region 62 may sometimes be referred to as a transreflective sensor object detection region or object detection region.

In the arrangement of FIG. 3, region 62 is formed within cavity 38. Configurations in which object detection region 62 is formed in other locations relative to support structures 40 may be used, if desired.

The transreflective sensor arrangement of FIG. 3 may exhibit a high signal-to-noise ratio, because fixed and/or moving external objects that are outside of the detection region of interest will not reflect light from light emitter TX to light detector zone of interest. For example, external object 56 will not be detected even though this object is in the light-emitting region associated with light emitter TX, because light reflected from object 56 is not within the light-detecting region associated with light detector RX and will therefore not be detected. As another example, external objects such as object 52 may lie within the light-detecting region for light detector RX, but are not within the light-emitting region associated with light emitter TX and will not be detected because they are not illuminated by emitted light from light detector TX. Other objects such as object 54 will not be illuminated by light from light emitter TX and do not lie in the light-detecting region for light detector RX and will also not be detected.

In general, an optical proximity sensor system in device 10 may include beam blocking optical proximity sensor components, reflective optical proximity sensor components, and/or transreflective optical proximity sensor components. In a beam blocking sensor arrangement, a light emitter creates a beam of light that is directly detected by an associated light detector except in the presence of an external object that interrupts the beam. This type of arrangement may be difficult to use in detecting ear presence in the outer portions of cavity 38 of FIG. 3, because the outer portions of cavity 38 are formed by relatively soft cushions (e.g., cushions 36) that may not be suitable for securing optical components. In a reflective sensor arrangement, a light emitter creates an outgoing beam of light that is reflected back towards a light detector that is adjacent to the light emitter. The light-emitting angular range and light-detection angular range in a reflective sensor arrangement are generally coincident with each other, which may make reflective sensor arrangements susceptible to noise from static objects such as device housing structures and other extraneous structures that happen to fall within the range of the sensor. Transreflective sensor arrangements such as the illustrative arrangement of sensor 40 of FIG. 3 can avoid such static object reflections by appropriate placement of the overlap between the light-emitting and light-detecting regions. Transreflective optical proximity sensor arrangements are therefore helpful in arrangements in which a high signal-to-noise ratio performance is desirable such as when detecting a user's ear in the presence of a black hair, which has a low reflectivity. If desired, a transreflective optical proximity sensor system for device 10 may include sensor components that are configured to implement other proximity sensor techniques such as beam blocking and reflective sensing in addition to transreflective sensing.

Figure 4:
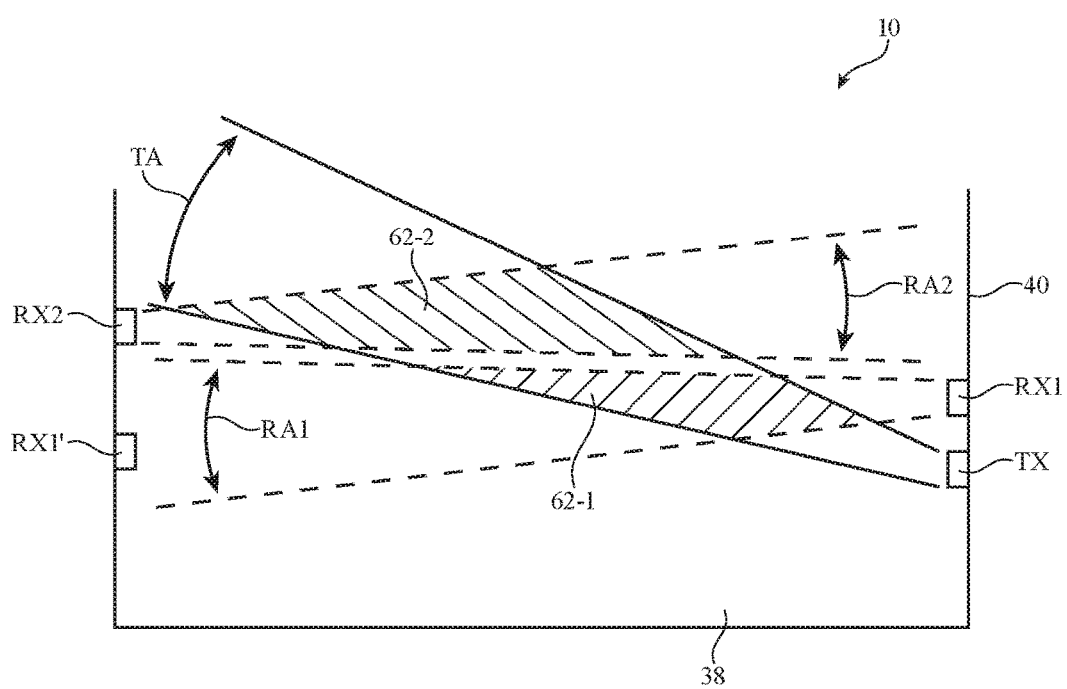

FIG. 4 is a diagram of device 10 in an illustrative configuration in which the optical proximity sensor system for device 10 includes both a transreflective portion and a reflective portion. A single light emitter TX that emits into light-emitting range TA and a pair of first and second light detectors (light detector RX1, which detects light in light-detection range RA1, and light detector RX2, which detects light in light-detection range RA2) are mounted to support structure 40. The light-emitting region associated with light emitter TX is configured to overlap with the light-detecting region of light detector RX2 in object detection region 62-2 while avoiding direct illumination of light detector RX2 with light from light emitter TX to form a transreflective sensor. The light-emitting region associated with light emitter TX is configured to overlap with the light-detecting region of light detector RX1 in object detection region 62-1 in a reflective sensor arrangement.

As described in connection with FIG. 3, light emitter TX and light detector RX2, which are located on opposing sides of cavity 38 and which are arranged so that light emitted by light emitter TX is not directly detected by light detector RX2, are configured to form a transreflective optical proximity sensor. Light emitter TX and light detector RX1 of FIG. 4 are located adjacent to each other on support structure 40 on the same side of cavity 38 and therefore form a reflective optical proximity sensor. If desired, light detector RX1 may be located in other portions of device 10 (e.g., detector RX1 may form a transreflective optical sensor with emitter TX by mounting detector RX1 in illustrative location RX1').

As the example of FIG. 4 demonstrates, multiple sensor components can be configured to detect objects in multiple associated object detection regions. These regions may, if desired, be located adjacent to each other (e.g., so that these regions overlap or are separated by a distance of less than 1 mm, less than 3 mm, or other small range). When used in conjunction with other, the multiple associated object detection regions form a single seamless or nearly seamless object detection region of enlarged dimensions. In the configuration of FIG. 4, for example, region 62-2 and region 62-1 are adjacent to each other and form a contiguous enlarged object detection region for detecting external objects within cavity 38.

During operation, control circuitry 20 can use information on whether any objects have been detected in regions 62-1 and 62-2 in determining the state of device 10. If desired, false object detections and other potential sources of error can be reduced by processing sensor output associated with both of regions 62-1 and 62-2. As an example, if an object is detected within innermost region 62-1 without previous detection of the object as it passed through region 62-2, the object detection event can be assumed to be erroneous and can be discarded. In general, information on the speed with which items pass through multiple object detection regions, information on the order in which items pass through multiple object detection regions, and/or information on whether an object is sufficiently large to be simultaneously detected in multiple object detection regions or is only present in a subset of the object detection regions may be used by control circuitry 20 in determining the nature of the external object and the associated operating status of device 10 (e.g., whether an ear or other object is present or absent in cavity 38, whether device 10 is being worn on a user's head over the user's ears, etc.).

Figure 5:
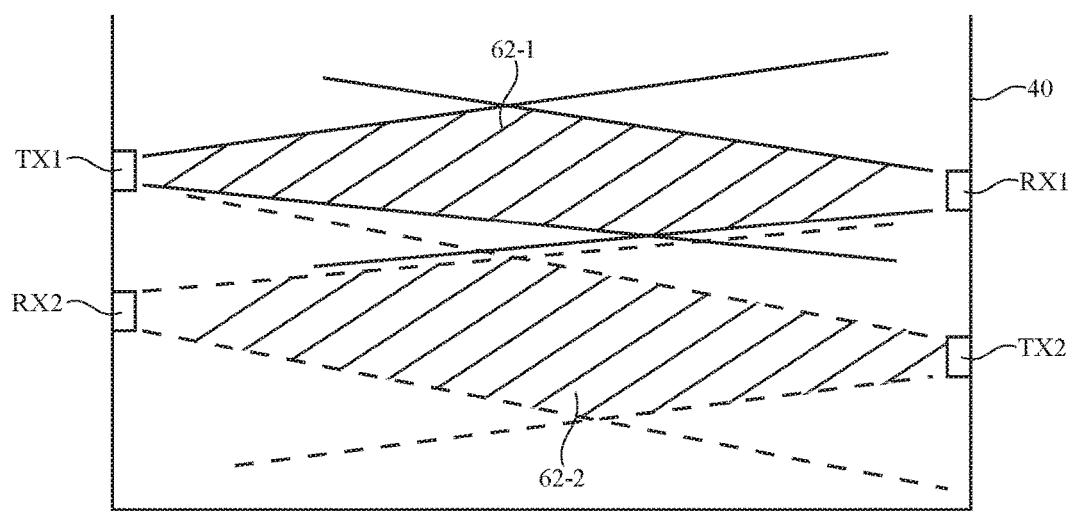

The illustrative sensor configuration of FIG. 4 includes a single light emitter TX and dual light receivers RX1 and RX2. If desired, multiple light emitters may be included. Consider, as an example, the arrangement of FIG. 5. In this type of configuration for device 10, a first portion of a transreflective optical proximity sensor system is formed from light emitter TX1 and light detector RX1. A second portion of transreflective optical proximity sensor system is formed from light emitter TX2 and light detector RX2. Light emitter TX1 and light detector RX1 detect external objects in object detection region 62-1, whereas light emitter TX2 and light detector RX2 detect external objects in object detection region 62-2. Regions 62-1 and 62-2 may, if desired, be adjacent to each other to form an enlarged (multi-zone) object detection region for device 10.

Figure 6:
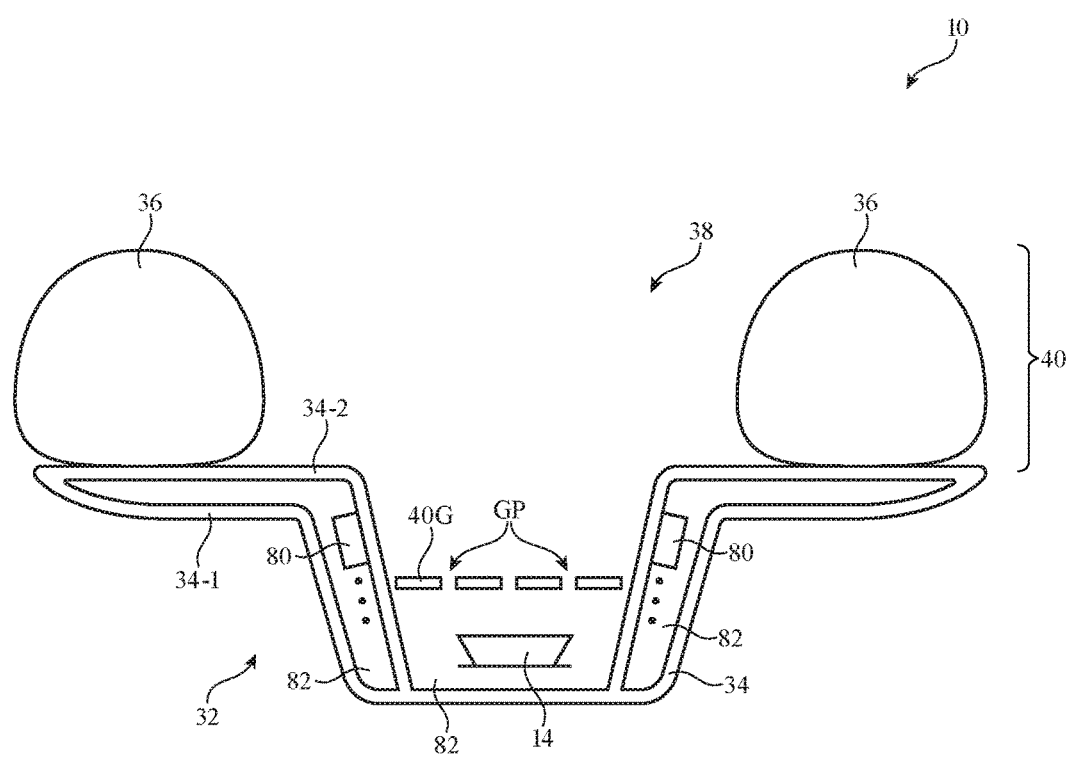

FIG. 6 is a cross-sectional side view of an illustrative ear cup for device 10. As shown in FIG. 6, support structures 40 may include housing wall structures 34 and ring-shaped cushion 36. Housing wall structures 34 may be formed from rigid polymer and/or other materials and may include one or more housing walls. For example, housing wall structures 34 may include inner housing wall 34-2 and outer housing wall 34-1. Speaker 14 may be mounted in interior region 82 between housing wall 34-1 and speaker grill 40G. Speaker grill 40G may be formed from a material such as metal, polymer, fabric, and/or other materials and may include sound openings such as openings GP that allow sound from speaker 14 to pass to a user's ear in cavity 38.

Device 10 of FIG. 6 may include electrical components 80 such as control circuitry 20, communications circuitry 22, input-output devices 24, and/or other components (batteries, wireless power circuitry, etc.). Components 80 may include integrated circuits, packaged and unpacked electrical devices, printed circuits, wires, and other circuitry for routing signals within device 10 and/or other circuitry. Components 80 may be mounted in interior regions of device 10 such as regions 82 (e.g., an area between inner and outer housing walls) and/or may otherwise be mounted in the interior of device 10 and/or on the exterior of device 10. Components 80 may include optical proximity sensor components such as light emitters and detectors for forming transreflective optical proximity sensors of the types described in connection with FIGS. 3, 4, and 5 and/or other optical proximity sensor systems. Mounting components such as optical components to rigid structures such as walls 34 may help create a stable platform for the optical components. Optical components may, if desired, include components for forming a transreflective optical proximity sensor that detects the presence of a user's ear in the outer portion of cavity 38 that is bounded by ring-shaped cushion 36.

Figure 7:
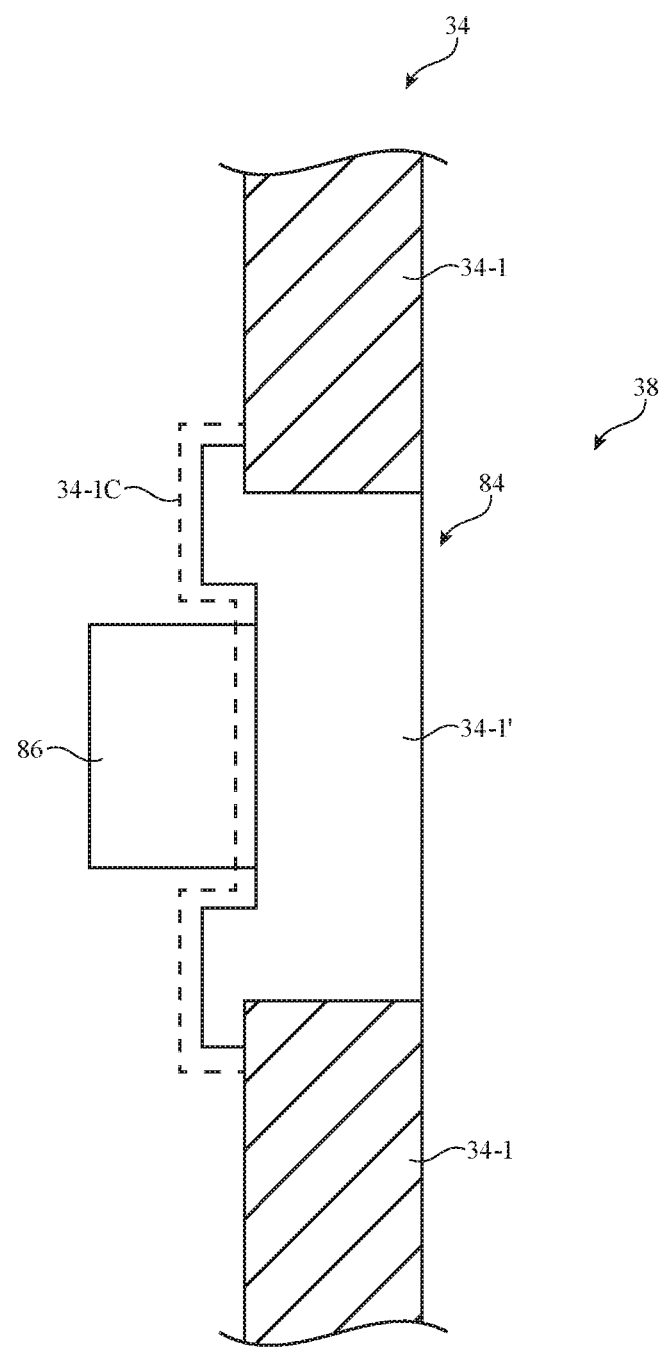
FIG. 7 is a cross-sectional side view of an illustrative electronic device housing wall with a window configured to accommodate a sensor component in accordance with an embodiment.

In arrangements in which sensor components such as light detectors and emitters are mounted in interior region 82, it may be desirable to form wall structures such as inner wall 34-2 from material that is transparent to the wavelength of light used by the light detectors and emitters (e.g., infrared light) and/or to form infrared-transparent window structures in inner wall 34-2. FIG. 7 is a cross-sectional side view of an illustrative infrared-transparent sensor window. As shown in FIG. 7, ear cup wall structures 34 may include inner wall 34-1. Inner wall 34-1 may be formed from a rigid polymer that serves as part of a rigid support structure for device 10. Openings may be formed in wall 34-1 to form windows such as illustrative sensor window 84. The openings may be filled with a material such as window material 34-1'. Optical sensor components such as sensor component 86 (e.g., a light emitter TX and/or a light detector RX) may be mounted in alignment with window 84 (e.g., so that component 86 is overlapped by window material 34-1').

Window material 34-1' may be transparent to the wavelength of light used by sensor component 86. For example, if sensor component 84 is an infrared light-emitting diode, infrared laser, or an infrared photodetector, window material 34-1' may be formed from an infrared transparent material such as infrared-transparent polycarbonate or other infrared transparent polymer. The material of wall 34-1 outside of window 84 may be formed from polymer or other material that is infrared transparent or that is not infrared transparent. The material of wall 34-1 outside of window 84 and/or window material 34-1' may be transparent to visible light and/or may be opaque at visible light wavelengths. In some configurations, for example, the material of wall 34-1 may be white or black polymer (e.g., visible-light-blocking-and-infrared-light-blocking material) and window material 34-1' may be visible-light-blocking-and-infrared-transparent material such as visible-light-blocking-and-infrared-transparent polycarbonate or other visible-light-blocking-and-infrared-transparent polymer. Arrangements in which material 34-1' is transparent at both visible and infrared wavelengths may also be used.

If desired, window 84 may include one or more optional coating layers. As an example, optional coating layer 34-1C may be interposed between component 86 and window material 34-1'. Coating layer 34-1C may be, for example, a visible-light-blocking-and-infrared-transparent polymer layer or a thin-film interference filter formed from multiple dielectric layers (e.g., alternating higher and lower refractive index layers) that is configured to block visible light and pass infrared light. Dyes, pigments, and other materials may be incorporated into a polymer or other material that forms coating layer 34-1C (and/or material 34-1' and wall 34-1) to provide these structures with desired optical transparency at the operating wavelength of optical component 86 while exhibiting other optical properties (e.g., a desired opacity and color) at other wavelengths.

Figure 8:
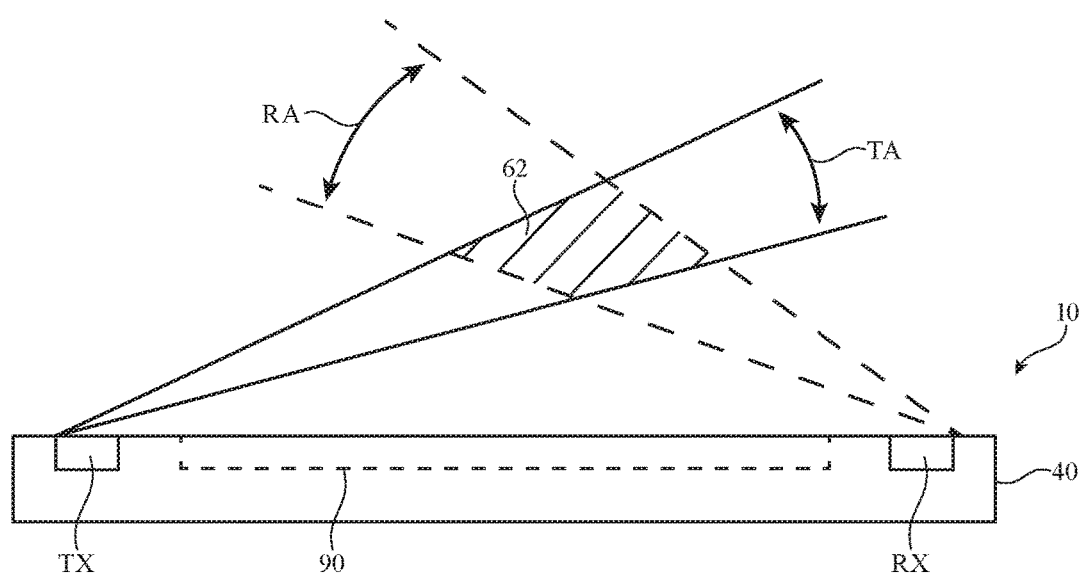
FIG. 8 is a cross-sectional side view of an illustrative electronic device with a transreflective sensor system in accordance with an embodiment.

FIG. 8 is a cross-sectional side view of electronic device 10 in an illustrative configuration in which device 10 is a cellar telephone, wristwatch device, tablet computer, laptop computer, or other electronic device with a display. As shown in FIG. 8, support structures 40 may be configured to form a housing for device 10 in which sensor components such as light emitter TX and light detector RX are mounted. Display 90 may be formed on a front face of device 10 or other suitable portion of support structures 40. Light emitter TX may be located at a first peripheral edge of a rectangular housing formed from structures 40 and light detector RX may be located at the opposing peripheral edge of the rectangular housing (e.g., the left and right sides of structures 40 in the orientation of FIG. 8, which may correspond to the upper and lower ends of a cellular telephone).

Light emitter TX and light detector RX may, if desired, be supported by support structures 40 in a configuration in which emitter TX and detector RX form a transreflective optical proximity sensor system where the light-emitting region of light emitter TX and the light-detecting region of light detector RX overlap in a desired object detection region 62 without mounting emitter TX and detector RX adjacent to each other and without mounting emitter TX and detector RX so that light from emitter TX is directly received by detector RX. Region 62 may, for example, be located above display 90 (e.g., 1-20 cm above display 90, at least 2 cm above display 90, less than 15 cm above display 90, at other distances in front of display 90, etc.). Control circuitry 20 may control content that is displayed on display 90 while using the transreflective optical proximity sensor system formed from light emitter TX and light detector TX to monitor for the presence of external objects in region 62. Suitable action can then be taken in response to information from the transreflective optical proximity sensor system. For example, in response to detecting a hand gesture in region 62 using one or more transreflective optical proximity sensors, control circuitry 20 can move items within the displayed content on display 90.

Figure 9:
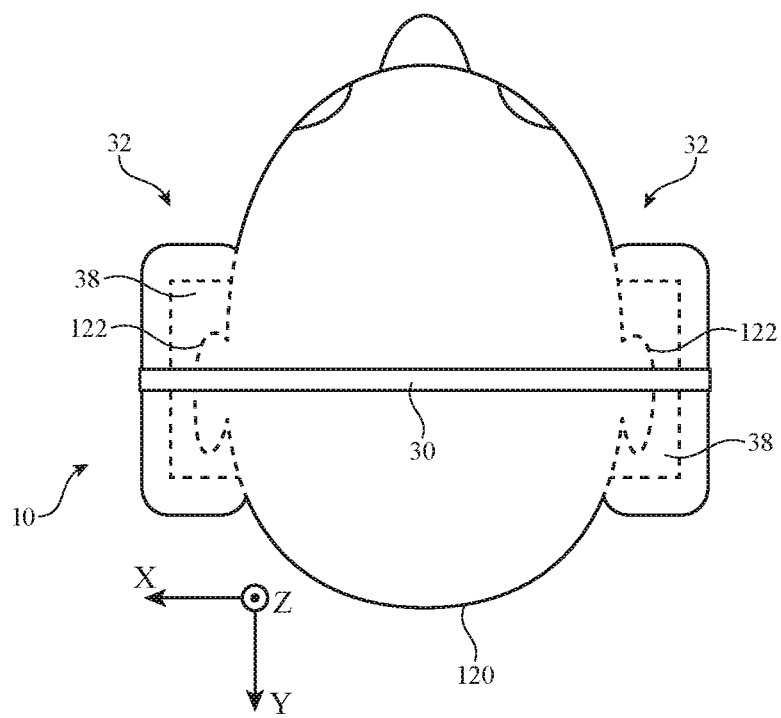
FIG. 9 is a top view of a user with a pair of illustrative headphones in accordance with an embodiment.

If desired, sensor components can be arranged to detect the shape and/or other attributes of an external object in cavity 38. Consider, as an example, the arrangement of FIGS. 9 and 10. FIG. 9 is a top view of a user's head (head 120) onto which a pair of headphones (device 10) has been placed. When the headphones are being worn by user 120, the user's ears 122 are received within cavities 38 of ear cups 32. FIG. 10 is a side view of ear cup 32 of FIG. 9 showing illustrative locations for sensor components in an optical proximity sensor system such as a transreflective optical proximity sensor system. In the example of FIG. 10, these transreflective sensor components include light emitter TX1 and a corresponding light detector RX1, light emitter TX2 and a corresponding light detector RX2, and optional light emitter TX3 and corresponding light detector RX3. Due to the anatomy of the user's ears, ears 122 are not symmetrical (e.g., from front to back). As a result, more portions of the user's ear (see, e.g., illustrative portions 122F of FIG. 10) may be located in the object detection region associated with emitter TX2 and detector RX2 than are located in the object detection region associated with emitter TX1 and detector RX1 (or vice versa). As a result, when the signal from detector RX2 is greater than the signal from RX1, control circuitry 20 can conclude that ear cup 32 is located on the user's right ear and when the signal from detector RX1 is greater than the signal from RX2, control circuitry can conclude that ear cup 32 is located on the user's left ear (as an example). The signal from detector RX3 can be used to confirm that ear 122 is present and/or can help distinguish between the user's left and right ears.

After using an arrangement of the type shown in FIG. 10 or other transreflective optical proximity sensor system that is sensitive to left/right ear determinations, control circuitry 20 can take suitable action. For example, control circuitry 20 can reverse the left/right channel assignments in device 10 in response to determining that device 10 is being worn in a reversed configuration or may take other actions in response to the measured left/right orientation of ear cups 32 on the user's ears 122.

The foregoing is merely illustrative and various modifications can be made to the described embodiments. The foregoing embodiments may be implemented individually or in any combination.

What is claimed is:

1. An electronic device, comprising:
   housing structures that form a cavity that receives an ear of a user;
   a speaker that supplies sound to the cavity; and
   a transreflective optical proximity sensor system that detects the ear in the cavity, wherein the transreflective optical proximity sensor system comprises:
      a light emitter on a first side of the cavity that emits light into a light-emitting region; and
      a light detector on an opposing second side of the cavity that detects light in a light-detecting region, wherein the light-emitting region and the light-detecting region overlap in an object detection region, wherein the cavity receives the ear of the user in the object detection region, and wherein the light emitter does not transmit light directly to the light detector when the ear of the user is not present.

2. The electronic device defined in claim 1 wherein the light emitter comprises an infrared light emitter and wherein the light detector comprises an infrared light detector.

3. The electronic device defined in claim 2 wherein the housing structures include a wall with an opening that is filled with infrared-transparent window material overlapping the infrared light emitter.

4. The electronic device defined in claim 1 wherein the housing structure includes a first wall portion on the first side of the cavity and a second wall portion on the second side of the cavity, wherein the first wall portion has a first infrared-transparent window through which the light emitter emits infrared light, and wherein the second wall portion has a second infrared-transparent window through which the light detector detects infrared light.

5. The electronic device defined in claim 1 wherein the transreflective optical proximity sensor system comprises an additional light detector and wherein the light detector and the additional light detector detect light emitted by the light emitter that has reflected from the ear while the ear is in the cavity.

6. The electronic device defined in claim 5 wherein the light emitter and the light detector detect objects in a first object detection region and wherein the light emitter and the additional light detector detect objects in a second object detection region that is different than the first object detection region.

7. The electronic device defined in claim 6 wherein the first and second object detection regions are adjacent and form an enlarged object detection region.

8. The electronic device defined in claim 1 wherein the transreflective optical proximity sensor system comprises:
   an additional light emitter and a corresponding additional second light detector that form an additional transreflective optical proximity sensor.

9. The electronic device defined in claim 1 further comprising control circuitry that gathers ear presence information from the transreflective optical proximity sensor system and that stops audio playback with the speaker in response to detecting the ear in the cavity.

10. The electronic device defined in claim 9 wherein the light emitter and the light detector are not located on a common side of the cavity.

11. The electronic device defined in claim 9 wherein the control circuitry uses information from the transreflective optical proximity sensor system to adjust a left/right audio channel assignment while playing audio through the speaker.

12. Headphones, comprising:
    first and second ear cups formed from support structures defining respective first and second cavities;
    a first speaker in the first ear cup that provides sound to the first cavity;
    a second speaker in the second ear cup that provides sound to the second cavity; and
    a transreflective optical proximity sensor having first and second components on opposing sides of the first cavity, wherein the first component comprises a light emitter on a first side of the first cavity, wherein the second component comprises a light detector on an opposing second side of the first cavity, and wherein the second component is configured to detect the presence of a reflected beam of light emitted by the first component.

13. The headphones defined in claim 12 wherein the first component comprises an infrared light emitter and wherein the second component comprises an infrared light detector.

14. The headphones defined in claim 13 wherein the infrared light emitter emits light into a light-emitting region, wherein the infrared light detector detects light in a light-detecting region, wherein the light-emitting region and the light-detecting region overlap in an object detection region, and wherein the first cavity receives an ear of a user in the object detection region.

15. The headphones defined in claim 14 wherein the infrared light emitter and infrared light detector are configured so that the infrared light detector does not receive light from the infrared light emitter in absence of an external object in the object detection region that reflects the emitted light.

16. The headphones defined in claim 13 further comprising first and second ring-shaped cushions coupled respectively to the support structures of the first and second ear cups, wherein the support structures form a housing wall with first and second infrared-transparent windows in the first cavity, wherein the infrared light emitter emits light through the first infrared-transparent window, and wherein the infrared light detector detects light through the second infrared-transparent window.

17. A headphone, comprising:
    a wall that forms an ear cup cavity;
    a speaker in the cavity;
    first and second windows in the wall on opposing sides of the cavity; and
    a transreflective optical proximity sensor having a light emitter that emits light through the first window and a light detector that receives light through the second window without receiving emitted light directly from the light emitter, wherein the light detector is configured to receive reflected light from the light emitter.

18. The headphone defined in claim 17 wherein the first and second windows include infrared-transparent polymer and wherein the light detector comprises an infrared light detector.

19. The headphone defined in claim 17 wherein the headphone is configured to receive an ear of a user within the ear cup cavity and wherein the light emitted by the light emitter is reflected by the ear of the user.

20. The headphone defined in claim 19 wherein the light detector is not configured to receive light from the light emitter when the ear of the user is not present.

* * * * *